(12) United States Patent
Uhm et al.

(10) Patent No.: US 6,806,439 B2
(45) Date of Patent: Oct. 19, 2004

(54) ELIMINATION OF AIRBORNE CHEMICAL AND BIOLOGICAL WARFARE AGENTS

(75) Inventors: Han Sup Uhm, 11613 Swains Lock Terrace, Potomac, MD (US) 20854; Yong C. Hong, Inchon (KR)

(73) Assignee: Han Sup Uhm, Potomac, MD (US)

( * ) Notice: Subject to any disclaimer, the term of this patent is extended or adjusted under 35 U.S.C. 154(b) by 0 days.

(21) Appl. No.: 10/340,737

(22) Filed: Jan. 13, 2003

(65) Prior Publication Data

US 2004/0134890 A1 Jul. 15, 2004

(51) Int. Cl.$^7$ ................................................ B23K 9/00
(52) U.S. Cl. ........................... 219/121.59; 219/121.36; 588/204
(58) Field of Search .............................. 219/121.59, 36, 219/48, 52, 37, 121.11; 423/210, 212, 219, 213.7; 204/164, 165; 588/204, 205, 210

(56) References Cited

U.S. PATENT DOCUMENTS 5,468,356 A  *  11/1995  Uhm ........................... 204/164
6,620,394 B2 *  9/2003  Uhm et al. .............. 423/240 R

* cited by examiner

Primary Examiner—Thor Campbell

(57) ABSTRACT

The invention is directed to an apparatus made of atmospheric-pressure microwave plasma torches for elimination of toxic airborne chemical and biological warfare agents. The apparatus can purify the interior air of large volume in an isolated space such as buildings, public transportation systems, and military vehicles contaminated with chemical and biological warfare agents. The apparatus consists of several microwave plasma torches connected in series for elimination and burnout of toxic airborne warfare agents. Microwave radiation generates an atmospheric plasma torch in certain conditions. Oxidation mechanism in the torch flames eliminates the chemical and biological warfare agents.

5 Claims, 3 Drawing Sheets

ELIMINATION OF AIRBORNE CHEMICAL AND BIOLOGICAL WARFARE AGENTS

FIELD OF THE INVENTION

Figure 1:
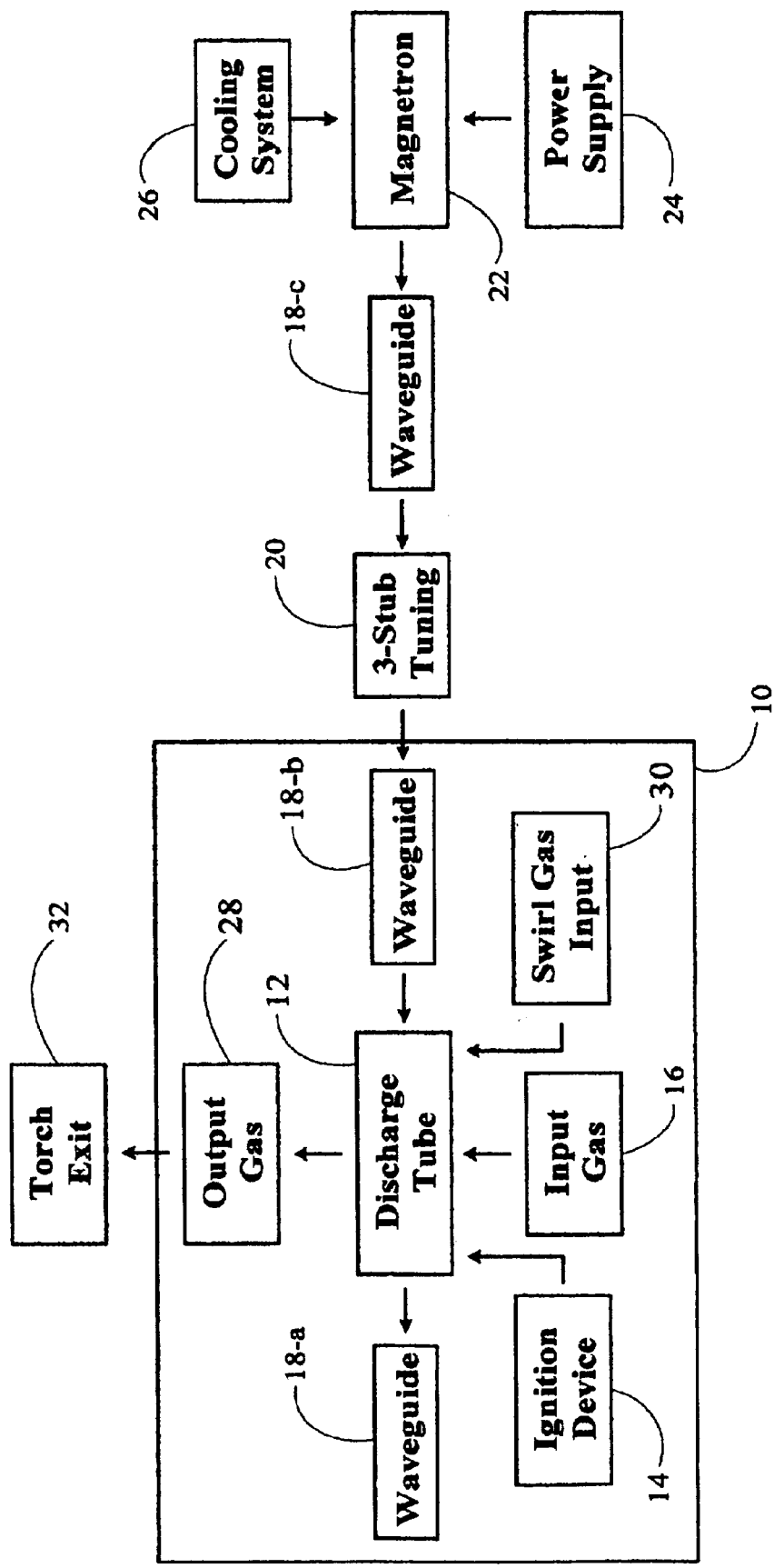

The present invention relates generally to pollutant abatement and, in particular, to an apparatus and process for eliminating and burning out pollutants in the interior air of large volume in an isolated space such as buildings, public transportation systems, and military vehicles contaminated by chemical and biological warfare agents. The chemical and biological warfare contaminants are eliminated by their exposure to the flames of the microwave plasma torches.

BACKGROUND OF THE INVENTION

Protection of people against chemical and biological warfare agents is very important and is very necessary in the present world environment. The threat of chemical and biological warfare agents increases in a domestic terrorist attack and in worldwide military conflict. Year 2001 anthrax problems throughout the USA after 9-11 terror attack, 1995 sarin nerve gas attack on a Tokyo subway station, and the threat of toxic agents in 1991 Gulf War are a few examples of the worldwide threat of chemical and biological warfare agents. There are several categories of chemical warfare agents. They are (1) Nerve Warfare Agents, (a) Tabun, GA: $CH_3)_2N—P(=O)(—CN)(—OC_2H_5)$, (b) Sarin, GB: $CH_3—P(=O)(—F)(—OCH(CH_3)_2)$, (c) Soman, GD: $CH_3—P(=O)(—F)(—CH(CH_3)C(CH_3)_3)$, (d) Cyclohexyl methylphosphonofluoridate, GF: $CH_3—P(=O)(—F)$ (cyklo—$C_6H_{11}$), (e) Methylphosphonothioic acid S-(2-(bis (1-methylethyl)amino)ethyl) O-ethyl ester, VX: $CH_3—P(=O)(—SCH_2CH_2N[CH(CH_3)_2]_2)(—OC_2H_5)$, (f) GE: Phosphonofluoridic acid, ethyl-, isopropyl ester, (g) VE: Phosphonothioic acid, ethyl-, S-(2-(diethylamino)ethyl) O-ethyl ester, (h) VG: Amiton, and (i) VM: Phosphonothioic acid, methyl-, S-(2-(diethylamino)ethyl) O-ethyl ester, (2) Blister and Vesicant Warfare Agents, (a) Lewisite (L), (b) Mustard-Lewisite (HL), (c) Nitrogen Mustards (HN-1, HN-2, HN-3), (d) Phosgene Oxime (CX), and (e) Sulfur Mustards (H, HD, HT), (3) Blood Warfare Agents, (a) Cyanogen Chloride (CK), and (b) Hydrogen Cyanide (AC), and (4) Pulmonary Warfare Agents, (a) Chlorine, (b) Chloropicrin (PS), (c) Diphosgene (DP), (d) Phosgene (CG). There are also several biological warfare agents such as Anthrax, Botulinum Toxins, Brucellosis, Cholera, Clostridium Perfringens Toxins, Congo-Crimean Hemorrhagic Fever, Ebola Haemorrhagic Fever, Melioidosis, Plague, Q Fever, Ricin, Rift Valley Fever, Saxitoxin, Smallpox, Staphylococcal Enterotoxin B, Trichothecene Mycotoxin, Tularemia, Venezuelan Equine Encephalitis. There may be other chemical and biological warfare agents not listed above. But, those warfare agents must be also eliminated by the present invention.

The purpose of the present invention is a rapid and effective elimination of toxic substances in the interior air in an isolated space such as buildings, public transportation systems, and military vehicles. The buildings, where the interior air must be purified, can be the personal dwellings, apartment buildings, office buildings, school buildings, government buildings, and the commercial buildings. The public transportation system includes automobiles, cars, buses, trains, ships, commercial airline airplanes, and the subway railroad system. The military vehicles mentioned are military trucks, armored personnel carriers, military buses, tanks, military ships, airplane carries, helicopters, and military airplanes. The toxic warfare agents mentioned above have been traditionally incinerated by burn scrubbers. These burners tend to be large, inefficient, and expensive. On the other hand, the microwave plasma torch operated at the atmospheric pressure is compact enough to be installed in a narrow space and is effective to eliminate the toxic agents diluted in a large flow rate of air.

Pollution control with respect to contaminated air as a carrier gas was proposed in U.S. Pat. No. 5,468,356 issued to Uhm, one of the present inventors, on Nov. 21, 1995. In that invention, contaminated air is exposed to microwave-generated plasma for oxidation by atomic oxygen without bulk heating within a simple cylindrical waveguide cavity at the room temperature. Further, such plasma is generated within the cavity by introduction of high-power microwave radiation passing through a weak electric field to achieve air purification despite low electron energy. Pollution control with respect to contaminated air as a hot carrier gas was proposed in U.S. Pat. No. 5,830,328 issued to Uhm, one of the present inventors, on Nov. 3, 1998. The plasma generated in a hot gas like discharge gas from a combustion engine or like the discharge gas from an incinerator may oxidize the contaminants, purifying the discharge air. The present invention is a combination of the above two inventions, making use of an intense electric field in the microwave radiations and use of the hot air in the torch flames of the present invention.

It is therefore an important object of the present invention to enhance the electric field strength of the microwave radiation in order to achieve elimination of toxic warfare agents in a carrier gas by exposure to a plasma torch generated by concentration of the microwave on a small spot.

Other object of the present invention is to simultaneously provide an elimination and burnout system that is effective against a wide range of chemical and biological warfare agents with several plasma torches connected in series.

Another object is to overcome difficulties heretofore experienced in achieving efficient and rapid elimination of the toxic agents by oxidation with several plasma torches connected in series.

Additional objects, advantages and novel features of the invention will be explained in part in the following description, and will be apparent to those skilled in the following experiment.

SUMMARY OF THE INVENTION

The present invention is the apparatus for simultaneous elimination and burnout of chemical and biological warfare agents diluted in air with several microwave plasma torches connected in series. Particularly, the apparatus is useful for purifying the interior air of large volume in an isolated space such as buildings, commercial transportation systems, and military vehicles contaminated with chemical and biological warfare agents. High electric field strength and high-energy electrons provided by the plasma torch are needed to eliminate and burn out chemical and biological warfare agents. The microwave plasma torches are connected in series so that the contaminant air stream to be purified passes sequentially from one plasma torch to the next, thereby increasing the required residence time for optimum effect. The high temperature flames of microwave plasma torches create a unique environment for efficient chemical reactions. Prolonging this unique environmental condition by sequential connection of optimum number of microwave plasma torches is critically important for rapid purification of a large volume of contaminated air, creating a synergic effect caused by multiple plasma torches. The number of the plasma torches is empirically determined.

Figure 2:
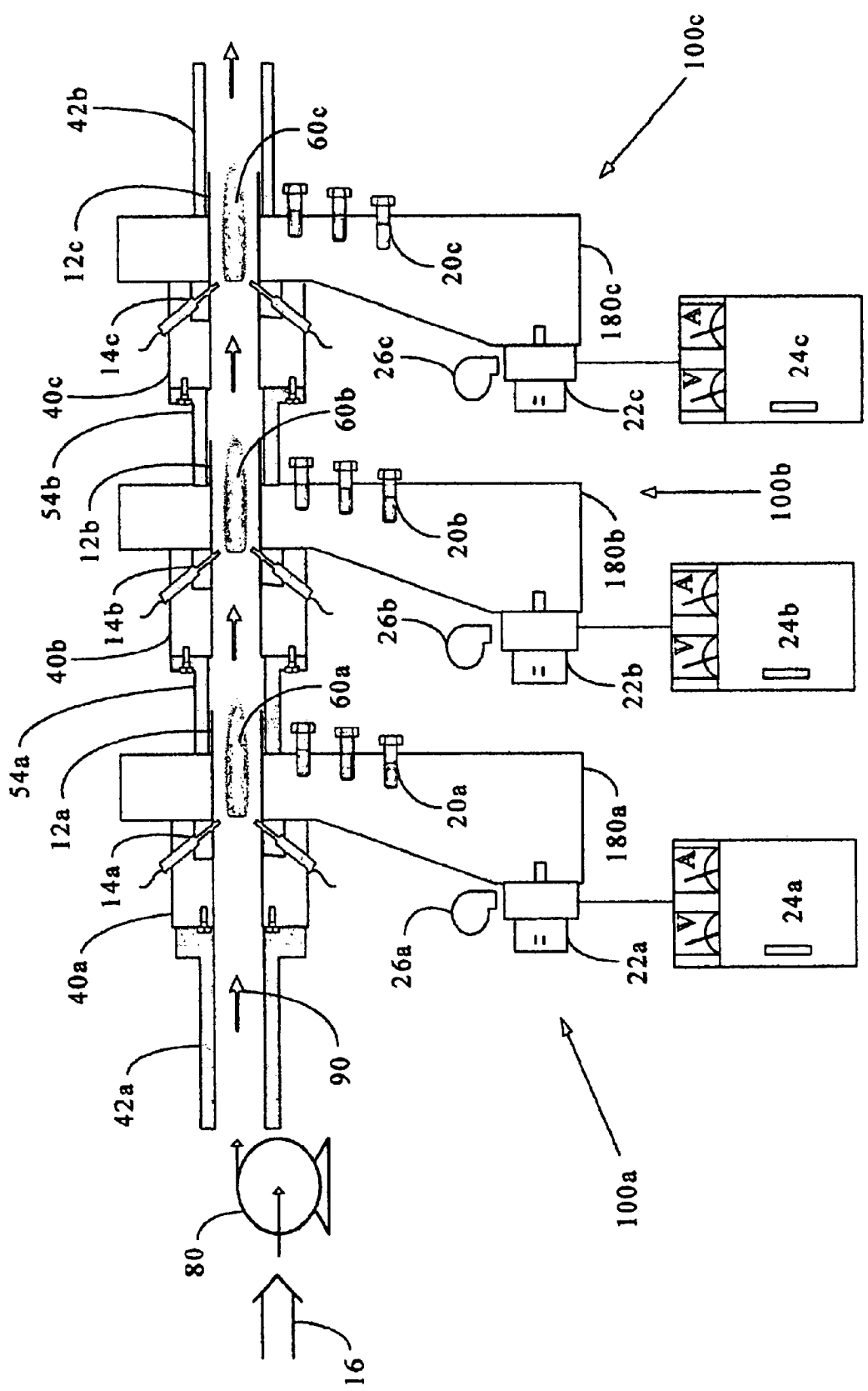
Figure 3:
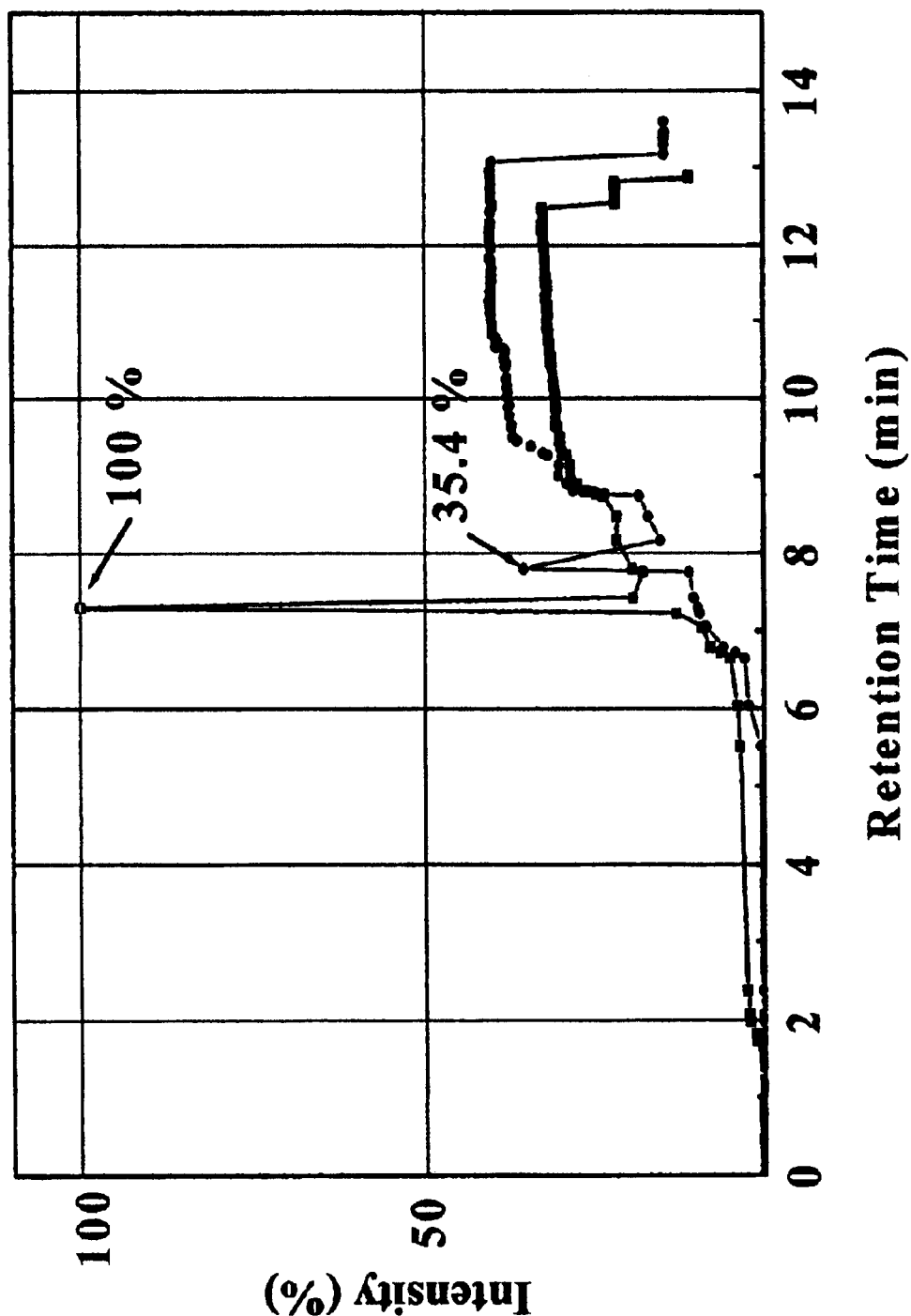

The present invention is made of the magnetrons used in home microwave ovens. These magnetrons are inexpensive, commercially available and compact. They are operated at a frequency of 2.45 GHz and their power is in the range of 0.6~1.4 kW. The microwave intensity with a frequency of 2.45 GHz from a magnetron is highest at the discharge tube. These intense microwaves at the discharge tube induce an intense electric field, initiating electrical breakdown in the carrier gas containing chemical and biological warfare agents. The plasma torch generated by the electrical breakdown due to the microwave electric field eliminates and burns out chemical and biological warfare agents by oxidation, by molecular breakdown, and by hot gases. The atmospheric plasma abatement system, which is simple and cost-effective, is the most suitable for purification of air contaminants. The elimination experiment of any chemical warfare agent is almost impossible in an ordinary laboratory due to safety issues. In this context, the experimentalists traditionally carry out a simulated experiment by making use of toluene gas. Elimination efficiency of toluene as one simulated agent was experimentally measured by a gas chromatography system. For same reason, the biological warfare agents are not used in an ordinary laboratory. Therefore, the vitrification and burnout of dried and pulverized sewage sludge powder as the biological simulated agent were carried out.

BRIEF DESCRIPTION OF DRAWING FIGURES

A more complete appreciation of the invention and many of its attendant advantages will be aided by reference to the following detailed description in connection with the accompanying drawings:

FIG. 1 is a block diagram illustrating the airborne warfare agent elimination system of the present invention;

FIG. 2 is a cross-sectional view of the three microwave plasma torches connected in series;

FIG. 3 is the transmittance of the toluene gas measured by the Gas Chromatography (GC) before and after the microwave discharges.

DETAILED DESCRIPTION

The present invention is the apparatus and scheme for a simultaneous elimination and burnout of chemical and biological warfare agents diluted in air with several microwave plasma torches connected in series. The principles and operation of modular microwave plasma torches of the present invention are described according to the drawings.

Referring now to the drawing in details, FIG. 1 diagrams the basic portion 10 of the present invention wherein air stream contaminated with chemical and biological warfare agents as input gas 16 enters the discharge tube 12 made of an insulating dielectric material such as quartz or ceramics. According to the experimental results with various quartz size, it was found that the most suitable plasma generation accomplished when the inner diameter of the quartz tube with thickness 1.5 mm is in the range of 22~27 mm for the microwave frequency of 2.45 GHz. Diameter of a typical plasma-torch flame is about 20 mm. The flame size does not increase even if the internal diameter of the quartz tube increases.

The power supply 24, consisted of full-wave voltage double circuit, provides the electrical power to the magnetron 22 which generates the microwave radiation and which is cooled by a cooling system 26, which must be capable of delivering at least 1000 liters per minute (1/min) cooling air. The magnetron 22 must be sufficiently cooled, because the magnetron efficiency is very sensitive to the temperature. The generated microwave radiation from the magnetron 22 is guided through the waveguide 18-*c*, passes through the three-stub tuning device 20, and enters the discharge tube 12 through the waveguide 18-*b*. The magnetron 22 in the present invention is the low-power 2.45 GHz microwave source used in a typical home microwave oven. Some of the microwave radiation in the discharge tube 12 goes forward to the end of the waveguide 18-*a* and is reflected back to the discharge tube 12. The electric field induced by the microwave radiation in the discharge tube 12 can be maximized by adjusting the three-stub tuning device 20. The ignition device 14 with its terminal electrodes inside the discharge tube 12 is fired to initiate plasma generation inside the discharge tube 12. The plasma torch in discharge tube 12 is ignited by the combined action of the ignition device 14 and the electrical power provided by the microwave radiation.

The torch flame in the discharge tube 12 is stabilized by the swirl gas input 30. The swirl gas enters the discharge tube sideways creating a vortex inside the discharge tube, stabilizing the torch flame and protecting the discharge tube wall, made of quartz tube, from heat emitted by the flame of temperature with 5,000 degrees Celsius. The swirl gas 30 plays important roles in the thermal insulation of the discharge tube 12 and in the stabilization of the plasma torch flame. Compressed air or contaminated air may be injected as a swirl gas 30. The output gas 28 is exhausted through the torch exit 32.

A cross-sectional view of three microwave plasma torches connected in series 100 is presented in FIG. 2. The apparatus 100 consists of three microwave plasma torches 100*a*, 100*b* and 100*c* connected in series. Each microwave plasma torch is connected with cylindrical tubes 54*a* and 54*b*, which are made of brass or stainless steel. The power supplies 24*a*, 24*b* and 24*c*, consisted of full-wave voltage double circuit as explained in FIG. 1, provide the electrical power to the magnetrons 22*a*, 22*b* and 22*c*, which generate the microwave radiations and which are cooled by each cooling system 26*a*, 26*b* and 26*c*. The generated microwave radiations are guided through the tapered waveguides 180*a*, 190*b* and 180*c*, which deliver effectively the microwave energies into the discharge tubes 12*a*, 12*b* and 12*c*. The ignition devices 14*a*, 14*b* and 14*c* attached to each microwave plasma torch 100*a*, 100*b* and 100*c* are fired to initiate plasma generation inside the discharge tubes 12*a*, 12*b* and 12*c*. The quartz holders 40*a*, 40*b* and 40*c* made of brass or stainless steel hold the discharge tubes 12*a*, 12*b* and 12*c*. A cylindrical tube 42*a* is set up on the bottom of the quartz holder 40*a* to transfer contaminated gas stream 16 sucked up by a blower fan 80 into the plasma torches 10*a*, 100*b* and 100*c* in turn. The blower fan 80 unit may act like a vacuum cleaner, even swiping surfaces and collecting contaminants settled on surfaces, if the tube 42*a* is made of a flexible material. The flow direction of gas stream 16 is represented by arrows 90. The plasma torches are connected in series, so that gas stream 16 to be purified, after exiting the plasma torch 100*a* via the discharge tube 12*a*, immediately enters the plasma torch 100*b* via the quartz holder 40*b*, after exiting the plasma torch 100*b* via the discharge tube 12*b*, immediately enters the plasma torch 100*c* via the quartz holder 40*c*. Each swirl gas, not shown in FIG. 2, is injected through metal pipeline, entering the discharge tubes 12*a*, 12*b* and 12*c* sideways, creating vortices inside the discharge tubes 12*a*, 12*b* and 12*c*, stabilizing the torch flames 60*a*, 60*b* and 60*c*. The microwave radiation intensity can be maximized at the discharge tubes 12*a*, 12*b* and 12*c* by adjusting the depth of the stubs in the three-stub tuning devices 20*a*, 20*b* and 20*c*. A cylindrical metal tube 42*b* is set up on the waveguide 180*c* to shield any leakage of microwaves and to protect the discharge tube 12*c* from any mechanical impact outside. For simplicity, only three microwave plasma torches are shown in FIG. 2. However, the device 100 can be modified for efficient decontamination of large volume of air by connecting more than 3 or less than 3 microwave plasma torches in series. The number of plasma torches connected in series is determined by elimination efficiency of the each chemical and biological warfare agents. This number can be determined in terms of the warfare agent species, of the each microwave torch power, and of the flow rate of contaminated air. The 3 plasma torches in FIG. 2 are determined for the toluene gas eliminations where 1000 liters per minute of contaminated air is purified by 1 kW microwave torches. Therefore, this number must be modified for each experimental situation.

Experimental results are presented in FIG. 3, which shows the gas chromatography intensity of transmittance of toluene gas. Shown in FIG. 3 is the transmittance intensity of the toluene gas measured by a gas chromatography (GC) system for 3 microwave plasma torches connected in series, as shown in FIG. 2. The GC and the capillary column used in the experiment have the model numbers of HP 5890 and HP-PLOT Q, respectively, which are manufactured by Hewlet Pakerd (HP) Corporation in U.S.A. The capillary column has 30 m long and 0.53 mm in outer diameter. The retention time of about 7.5 minute in the horizontal line in FIG. 3 represents signature of the toluene concentration. 850 liters per minute (lpm) of air mixed with toluene gas is used as the input gas 16. 70 lpm of compressed air in the plasma torch 100*a*, and each 40 lpm of compressed air in the plasma torches 100*b* and 100*c* are injected as the swirl gas in this test. Therefore, total flow rate of 1000 lpm enters the apparatus 100 presented in FIG. 2 of 3 plas torches connected in series. Length of the connecting tube 54*a* and 54*b* is optimized to be 7 cm for the experimental data in FIG. 3. The toluene concentration was 150 particulates per million (ppm). One hundred percent of the toluene contaminants are transmitted through the discharge tubes without electrical discharges, as presented by the closed square dots in FIG. 3. 64.6% of the toluene contaminants are eliminated by three-microwave plasma torches connected in series when the plasma torches are on, as represented by the closed diamond dots in FIG. 3. The most dominant byproducts after elimination of toluene gas by the microwave plasma torches are observed to be water ($H_2O$) and carbon dioxide ($CO_2$). The experiment was carried out five times. Thus, each data point in FIG. 3 represents an average value of five data The input microwave power for each plasma torch is about 1 kW.

A simple first order decay model for treating target chemicals is expressed as $$X/X_0=\exp(-E/\beta),$$

where X is the concentration of the target chemical agent after the microwave discharge, $X_0$ is the initial concentration of the target chemical agent and E is the energy density joule per liter) of three microwave plasma torches connected in series. The factor β represents the energy density required for bringing down the concentration to 1/e of its initial concentration; i.e. the energy density needed for 63% decomposition. Value of the energy density β for the experimental data presented in FIG. 3 is 173 joules per liter. This value is much less than β=393 joules per liter of the pulsed corona discharge. It is also emphasized that a large volume of air can be treated by a compact apparatus in this invention. However, it is pointed out that 1000 lpm of air passes through the plasma flame of 3 kW for the experimental data in FIG. 3. Therefore, relatively hot air exits from the microwave torch. In fact, the air temperature at 50 cm downstream from the third torch in the experiment of FIG. 3 is about 80 degree Celsius for the 25 degree room temperature. In this context, the air in an isolated room may heat up like a 3 kW electric heater in the room, thereby needing a cooling system in summer.

It was observed in the repeated experiments that a synergic effect of the plasma torches connected in series is a main reason why this apparatus works effectively. Experimental data obtained from experiments, where 350 lpm air contaminated with 150 ppm toluene gas was treated by a 1-kW microwave torch, indicated only 35% decomposition of toluene molecules, which is far less than 64.6% decomposition as shown in FIG. 3. Value of the energy density β is calculated to be 396 joules per liter for one plasma torch, which is much larger than β=173 joules per liter in FIG. 3 for 3 torch system. Obviously, the synergic effect of multiple plasma torches connected in series plays a pivotal role in efficient elimination of the chemical and biological warfare agents contaminated in air. The number of torches connected in series and the length of the connecting tube 54*a* and 54*b* are determined by minimum value of the energy density β, The experimental data indicates the minimum value of β=173 joules per liter in FIG. 3 for 3 torch system with the connecting tube length of 7 cm in eliminating toluene gas by 1 kW microwave torches.

A thermo-coupler located about 8 cm away from the bottom of the plasma flame generated by 1 kW microwave power is about 1800 degree Celsius. The temperature increases drastically to 5500 degree Celsius measured by a spectroscopy, as the observation point approaches the bottom center of the flame. Most of the microwave power is used for ohmic heating of the flame center at a very high temperature. But, this plasma flame element drifs away from the center due to air blow, cooling its temperature as the fluid element of air moves away from the center. Temperature of any physical object like microbes moving with the plasma flame element is therefore very high due to the radiation emitted from the flame center and due to the gas temperature of the flame. The airborne biological warfare agents mixed in air can be eliminated by the high temperature of the plasma torch flames. The biological warfare agents are finely aerosolized to be airborne. For example, anthrax spores are attached on fine organic or inorganic particles with submicron size, floating freely in air.

In order to simulate killing of the biological warfare agents, vitrification experiments of sewage sludge powders are carried out. Sewage sludge powders used in the experiment were pulverized in the diameter of about 50~500 micrometer and dried up to the moisture concentration of 10%. This experiment was done using only one microwave plasma torch of 1 kW power. The powders were injected through the discharge tube with air as a carrier gas. The powder before vitrification is very fine as prepared. The microscopic picture of 50 magnifications of the leftover ashes after vitrification experiment shows glassified grains, which are significantly larger than the initial size of the powder. Obviously, the powders were vitrified by hot local temperature of the microwave plasma torch. Volume of the sludge powers reduces considerably after passing through the microwave plasma torch, indicating that most of the hydrocarbons in the sludge were burnt out. The vitrification experiment of the sludge powers clearly indicates that the airborne biological warfare agents like microbes or bacteria attached on organic or inorganic aerosols may burn and die, as they pass through a microwave plasma torch, vitrifying the leftover ashes from burnout. Efficiency of the aerosol elimination was measured by making use of airborne soot emitted from a diesel engine. Remember that biological warfare agents are attached on the aerosol particles. Thus, elimination of aerosol in air is an effective means of killing of biological warfare agents. An intentionally-spoiled diesel engine produces a fair amount of soot, which are fine particulates made of carbon molecules. The soot elimination is measured by a collection of the soot on a white filter. The experimental data indicate that significantly more than 90% of the soot emitted from a 2000 cc diesel engine, operating with 2000 rpm, is eliminated by 3 plasma torches connected in series for the physical parameters identical to the experiment for FIG. 3. Flow rate of the discharge gas from the diesel engine used in this experiment is 4000 lpm, although the gas temperature is high. This experiment indicates that the aerosols in a large flow rate may effectively eliminated by the present invention. This experiment also clearly demonstrated that soot from the diesel engines in buses, trucks and ships can be eliminated by the apparatus of the present invention. For optimum result, the discharge gas can be recycled through the system. If there are any harmful residues, ashes, byproducts are still remain in the discharge gas, the conventional system such as scrubbers, absorbers, etc, can be attached to the present invention for elimination of these leftovers.

Although this embodiment is the apparatus for elimination of airborne toluene gas and airborne sludge powders, the invention is not limited to the use of the elimination of toluene gas and sludge powders. Without departing from the spirit of the invention, numerous other rearrangements, modifications and variations of the present invention are possible in light of the foregoing teachings. It is therefore to be understood that within the scope of the appended claims, the invention may be practiced otherwise than as specifically described.

What is claimed is:

1. An apparatus for eliminating chemical and biological warfare agents in air, said apparatus comprising:
    (a) microwave plasma torches connected in series for optimum synergic effects, wherein each microwave plasma torch includes an input tube for injection of air contaminated with said agents into said microwave plasma torch and an output tube for discharging the treated gas stream from said microwave plasma torch;
    (b) the first microwave plasma torch and the second microwave plasma torch connected in series, wherein the input tube of the second microwave plasma torch is aligned for transferring the gas stream discharged from the output tube of the first microwave plasma torch;
    (c) several microwave plasma torches connected in series, wherein said microwave plasma torches are aligned in the same direction as the gas stream;
    (d) individual power supply for each of the said microwave plasma torches, wherein each of said microwave plasma torches forms a plasma flame such that gaseous or biological species are destroyed and burn out; and
    (e) individual ignition device for each of said microwave plasma torches.

2. In the apparatus according to claim 1, wherein a suction fan is attached to the first microwave plasma torch to inject air contaminated with said agents, and wherein the suction fan unit functions as a vacuum cleaner collecting contaminants settled on surfaces to be decontaminated.

3. A multi-step process for optimum synergistically eliminating chemical and biological warfare agents in air by passing said air contaminated with said agents through a plurality of serially connected microwave plasma torches wherein each microwave plasma torch consists of an input tube for introduction of said contaminated air, a plasma formation zone and an output tube for discharging the treated gas, said process comprising:
    (a) initially passing at least 1000 liters per minute of said contaminated air through the input tube of the first microwave plasma torch unit operating at 2.45 GHz and 0.6–1.4 kW power range;
    (b) sending the decontaminated gas from said first plasma unit into a second plasma unit;
    (c) repeating steps (a) and (b) through a plurality of serially-connected, plasma units to accomplish a desired level of decontamination.

4. In the process according to claim 3, wherein the contaminated air as a swirl gas is injected into said plasma formation zone to stabilize the plasma, forming a vortex flow for each microwave plasma torch.

5. The process according to claim 4, wherein the contaminated air stream and additional makeup air mix in said plasma formation zone.

* * * * *